United States Patent Office 3,378,609
Patented Apr. 16, 1968

3,378,609
OIL- AND WATER-REPELLENT COMPOSITIONS
Ross Wade Fasick, Wilmington, Rulon Edward Johnson, Jr., Newark, and Stuart Raynolds, Wilmington, Del., assignors to E. I. du Pont de Nemours and Company, Wilmington, Del., a corporation of Delaware
No Drawing. Continuation-in-part of application Ser. No. 107,330, May 3, 1961. This application June 19, 1963, Ser. No. 288,894
6 Claims. (Cl. 260—890)

ABSTRACT OF THE DISCLOSURE

An oil- and water-repellent composition consisting essentially of (1) either a polymer of $$CH_2\!=\!C(CH_3)CO_2CH_2CH_2C_nF_{2n+1}$$

or a copolymer of $CH_2\!=\!C(CH_3)CO_2CH_2CH_2C_nF_{2n+1}$ and a vinyl monomer free of non-vinylic fluorine and (2) either a polymer of a monovinyl monomer free of non-vinylic fluorine or a non-fluorinated conjugated diene. The compositions impart oil- and water-repellent properties to fabrics when the fabrics are treated with compositions in an aqueous bath.

---

This application is a continuation-in-part application of applicants' prior application Ser. No. 107,330, filed May 3, 1961, now abandoned.

This invention is directed to the use of mixtures of fluorine containing polymers and nonfluorine containing polymers as water and oil repellents for textiles, paper, leather and other fibrous and porous materials which will absorb and transport low surface tension liquids either on their surfaces or into their interstices by capillary action.

Although fluorine containing polymers are readily available, it is well known that they are somewhat expensive. Their expense has been the primary reason for their lack of widespread commercial acceptance.

It is, therefore, an object of this invention to provide novel water and oil repellent compositions for textiles, leather, paper and other materials as above described, which compositions consist of mixtures of fluorine containing compounds and nonfluorine containing compounds where the latter type forms a major proportion of the mixture, which are stable to heat and light, non-discoloring, durable on substrates and in latex form.

Another object of this invention is to provide a process for treating textiles, paper, leather and other materials as above described with these compositions to render them oil and water repellent.

These and other objects will become apparent in the following description and claims.

The present invention is directed to a polymeric product comprising from about 3% to about 60% by weight of a polymer prepared from at least one polymerizable fluorine containing aliphatic compound of structure $$CH_2\!=\!C(CH_3)CO_2CH_2CH_2C_nF_{2n+1}$$

wherein $n$ is an integer of from 3 to 14 and from about 40% to about 97% by weight of a polymer prepared from at least one polymerizable vinyl compound chosen from

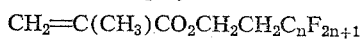

$CH_2\!=\!CHO_2CR^2$, $CH_2\!=\!CHR^3$, $CH_2\!=\!CHY$, $CH_2\!=\!CY_2$, $CH_2\!=\!CHCH_2O_2CR^2$

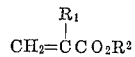
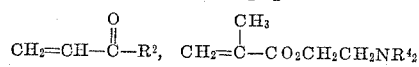

$CH_2\!=\!CR'CONHCH_2OH$, 1,3-butadiene, 2-chlorobutadiene 2,3-dichloro-1,3-butadiene or isoprene wherein R' is H or methyl, $R^2$ is a saturated alkyl group containing from one to 18 carbons, $R^3$ is phenyl or alkyl substituted phenyl, $R^4$ is hydrogen or saturated alkyl groups of one to six carbons and Y is fluorine, chlorine or bromine; a water dispersion or latex of this composition and fabrics or paper treated with this composition to render them water and oil repellent.

Another embodiment of the present invention is a polymeric composition which is a mixture of (a) at least one copolymer comprising from about 25% to about 99% by weight of at least one polymerizable fluorine containing compound $CH_2\!=\!C(CH_3)CO_2CH_2CH_2C_nF_{2n+1}$ and from 1% to about 75% by weight of at least one polymerizable vinyl compound and (b) a polymer prepared from at least one polymerizable vinyl compound, the weight proportion of said copolymer and said vinyl polymer being such that the mixture contains at least 3% by weight of the component.

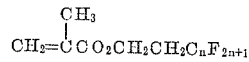

a water dispersion or latex of said composition and fabrics, paper and other fibrous or porous materials as above described treated with said composition to render them oil and water repellent.

This invention also is directed to a process for treating fibrous or porous materials for the purpose of imparting oil and water repellency thereto which comprises impregnating said materials with an aqueous bath containing from about 0.1 to about 10% by weight of a composition as defined and, by any convenient means, expressing the excess liquid therefrom to effect a dry pick-up of between 0.1 and 10% on weight of fabric of total solids, said pick-up being equivalent to at least about 0.03% on weight of fabric of the fluorinated monomer, and heating the expressed material at from about 165° C. to about 195° C. for at least 15 seconds.

The present invention contemplates the methacrylate monomers

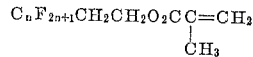

It also contemplates the homopolymers of this type of monomer having the recurring unit

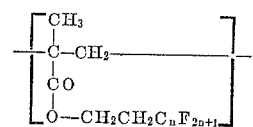

It is to be understood that $n$ may be the same or different in the various recurring units contained in the polymer chain. Thus, the polymer can be a homopolymer of, for example, $C_8F_{17}CH_2CH_2O_2CC(CH_3)\!=\!CH_2$, a copolymer of $C_6F_{13}CH_2CH_2O_2CC(CH_3)\!=\!CH_2$ and $$C_9F_{19}CH_2CH_2O_2CC(CH_3)\!=\!CH_2$$

or a terpolymer of $C_6F_{13}CH_2CH_2O_2CC(CH_3)\!=\!CH_2$ and $C_8F_{17}CH_2CH_2O_2CC(CH_3)\!=\!CH_2$.

The group $C_nF_{2n+1}$ contains from three to about 14 carbons. Examples of this group are n-$C_3F_7$—, n-$C_4F_9$—, n-$C_5F_{11}$—, n-$C_6F_{13}$—, n-$C_7F_{15}$—, n-$C_8F_{17}$—, n-$C_9F_{19}$—, n-$C_{10}F_{21}$—, n-$C_{12}F_{25}$— and n-$C_{14}F_{29}$—.

The methacrylate esters may be prepared from the alcohols $C_nF_{2n+1}CH_2CH_2OH$ which undergo ready esteri-

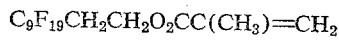

fication with methacrylic acid or trans esterification with alkyl methacrylates, i.e.

(1)
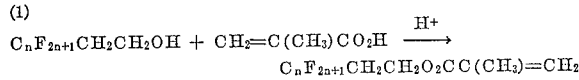
$$C_nF_{2n+1}CH_2CH_2OH + CH_2=C(CH_3)CO_2H \xrightarrow{H^+}$$
$$C_nF_{2n+1}CH_2CH_2O_2CC(CH_3)=CH_2$$

(2)
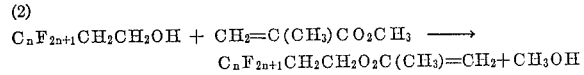
$$C_nF_{2n+1}CH_2CH_2OH + CH_2=C(CH_3)CO_2CH_3 \longrightarrow$$
$$C_nF_{2n+1}CH_2CH_2O_2C(CH_3)=CH_2 + CH_3OH$$

The alcohols $C_nF_{2n+1}CH_2CH_2OH$ can also be esterified by reaction with methacrylyl chloride. An alternate method of preparing these esters is reaction (3) which follows:

(3) $C_nF_{2n+1}CH_2CH_2I + CH_2=C(CH_3)CO_2Ag \rightarrow$
$$C_nF_{2n+1}CH_2CH_2O_2CC(CH_3)=CH_2$$

The iodides $C_nF_{2n+1}CH_2CH_2I$ are prepared by reacting $C_nF_{2n+1}$ with ethylene (see Haszeldine et al., J. Chem. Soc., 1949, 2856; 1950, 3041 and Park et al., Wadc 56–590, part II, ASTIA 151014; J. Org. Chem., 23, 1166 (1958)). The iodides $C_nF_{2n+1}I$ are available by the methods of Haszeldine et al. (Nature, 167, 139 (1951); J. Chem. Soc., 1953, 3761) and Brice and Simons (J.A.C.S. 73, 4016 (1951)). The alcohols $$C_nF_{2n+1}CH_2CH_2OH$$

are known, see Pierce et al., J.A.C.S. 75, 5618 (1953); Park et al., J. Org. Chem., 23, 1166 (1958). The method used by Pierce et al. and Park et al. to prepare these alcohols is as follows:

(4)
$$C_nF_{2n+1}CH_2CH_2I + AgO_2CCH_3 \longrightarrow C_nF_{2n+1}CH_2CH_2OCCH_3$$

(5)
$$C_nF_{2n+1}CH_2CH_2O_2CCH_3 + H_2O \xrightarrow{H+} C_nF_{2n+1}CH_2CH_2OH$$

Another route discovered for preparing these alcohols involves the following steps:

(6)
$$C_nF_{2n+1}I + CH_2=CHO_2CCH_3 \xrightarrow{catalyst} C_nF_{2n+1}CH_2CHIO_2CCH_3$$

(7)
$$C_nF_{2n+1}CH_2CHIO_2CCH_3 + Zn \xrightarrow[C_2H_5OH]{HCl} C_nF_{2n+1}CH_2CH_2OH$$

The polymers of these methacrylate monomers are readily prepared using bulk, solution, suspension and emulsion techniques. Initiation can be accomplished by any of the known art methods commonly employed for methacrylate polymerizations.

Although the polymers of this invention can be used alone as water and oil repellents, it has been found far more advantageous to use these polymers as mixtures with polymers of nonfluorine containing monomers. The advantage gained is that relatively small amounts of the fluorine containing methacrylate polymer can be used with major amounts of the other cheaper polymer with results that are actually superior to the fluorinated polymers or mixtures of these with other polymers are applied to substrates by essentially standard techniques which are well known to the art.

The fluorine containing monomers utilized according to the present invention have the structure $$CH_2=C(CH_3)CO_2CH_2CH_2C_nF_{2n+1}$$

and contain a polyfluoroalkyl group $F(CF_2)_n$ wherein $n$ is from 3 to about 14. When $n$ is one or two, good repellencies are not obtained. When $n$ is greater than about 14, the polymeric products become less useful since they are not readily polymerized and serve no useful purpose over those wherein $n$ is 14 or less. The preferred species are 1H,1H,2H,2H-nonafluorohexyl methacrylate, 1H,1H,2H, 2H-tridecafluorooctyl methacrylate, 1H,1H,2H,2H-hepta- decafluorodecyl methacrylate and 1H,1H,2H,2H-henicosafluorododecyl methacrylate.

The polymerizable vinyl compounds which may be used in this invention include alkyl acrylates and methacrylates, vinyl esters of aliphatic acids, styrene and alkyl styrenes, vinyl halides, vinylidene halides, allyl esters, vinyl alkyl ketones, certain acrylamides and 1,3-butadiene and its derivatives. Representative examples include: methyl acrylate and methacrylate, propyl acrylate and methacrylate, butyl acrylate and methacrylate, isoamyl acrylate and methacrylate, 2-ethylhexyl acrylate and methacrylate, octyl acrylate and methacrylate, octadecyl acrylate and methacrylate, lauryl acrylate and methacrylate, cetyl acrylate and methacrylate, N,N-diethylaminoethyl acrylate and methacrylate, vinyl acetate, vinyl propionate, vinyl caprylate, vinyl laurate and vinyl stearate, styrene, α-methylstyrene, p-methyl styrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylol acrylamide, N-methylol methacrylamide, glycidyl acrylate and glycidyl methacrylate.

The preferred nonfluorinated monomer class is alkyl methacrylates. It is often preferable to include a small amount of N-methylol acrylamide as a copolymer with the alkyl methacrylates since durability is increased thereby. The preferred alkyl methacrylates are n-butyl, n-amyl, n-hexyl, isoamyl, 2-ethylhexyl, n-heptyl and n-octyl methacrylates. Styrene, 2,3-dichloro-1,3-butadiene and alkyl acrylates are also quite useful in the present invention but generally less preferably than the methacrylates.

Esters of acrylic and methacrylic acid are well known and, in many cases, commercially available materials, e.g. methyl, ethyl, butyl, 2-ethylhexyl acrylates and methyl, ethyl, butyl, isobutyl, hexyl, octyl, decyl, lauryl, stearyl, N,N-diethylaminoethyl methacrylates. All are readily prepared by esterification of the alcohol and acid in the presence of an acid catalyst.

Vinyl acetate, vinyl 2-ethylhexanoate and vinyl stearate are commercially available. The others are readily prepared by reaction of vinyl acetate with the desired acid in the presence of mineral acid or by reaction of the desired acid with acetylene in the presence of a catalyst.

Styrene, alkyl styrenes, butadiene, chlorobutadiene, dichlorobutadiene and isoprene are well known commercially available compounds. Vinyl and vinylidene halides are also well known and commercially available. Allyl esters are also well known and many are commercially available, e.g. allyl caproate, allyl caprylate, allyl heptanoate, allyl isovalerate and allyl propionate. Methyl vinyl ketone is well known and commercially available. Other alkyl vinyl ketones may be prepared by the reaction of methyl alkyl ketones with formaldehyde in the presence of sulfuric acid. Methylol acrylamide is also commercially available.

The novel water and oil repellent compositions of this invention comprise a mixture of a fluorine containing polymer and a nonfluorine containing polymer. The fluorine containing polymer may consist of one or more fluorine containing monomers or of one or more of the fluorine containing monomers copolymerized with a nonfluorine containing monomer. In the latter case, the polymer consists of about 25% to about 99% by weight of the fluorine containing monomers. If the fluorine containing polymer contains less than about 25% by weight of the fluorine containing monomer, poor repellencies (or no repellency) are obtained.

The non-fluorine containing polymer is prepared from one or more of the non-fluorine containing monomers previously described.

It is necessary that the polymer mixture contain at least 3% by weight of the fluorine containing monomer. At lower concentrations, unsatisfactory repellencies are obtained. The upper limit of 60% placed on the fluorine containing monomer is determined by economic considerations. When the compositions of this invention are used to impart oil and water repellency to fabrics and no other adjuvants or textile treating agents are used, 25% fluorine containing monomer is a practical upper limit and about 15% is preferred. More than 25% fluorinated monomer may be used but serves no additional useful purpose. When other adjuvants or textile treating agents are to be used however, it is preferable to use more than 25% fluorinated monomer. In this case 60% fluorinated monomer is the practical upper limit and about 40% fluorinated monomer is preferred.

There is a distinct advantage obtained when a small amount of N-methylol acrylamide is included in either the fluorinated or non-fluorinated polymer. The advantage is that the compositions thus obtained are more durable on fabrics than those which do not contain these compounds.

The molecular weight of both the fluorinated and non-fluorinated polymers is not a controlling factor as useful repellents are obtained over a wide range of molecular weights of both types of polymers.

It should be noted that the fluorine containing monomers defined do not have fluorine attached to the carbon atoms of the polymerizable vinyl group but only in the groups attached to the vinyl group. For the purposes of this invention, monomers containing fluorine attached only to the carbons of the vinyl group (e.g. vinyl fluoride and vinylidene fluoride) are not considered to be fluorine containing monomers.

In the practice of this invention, the fluorine containing monomer and the nonfluorine containing monomer are polymerized separately, generally by an emulsion polymerization technique. The latexes of the fluorine containing polymer and nonfluorine containing polymer are then mixed together in the desired proportions and applied to the substrate. The fluorinated and nonfluorinated monomers may be copolymerized and resulting latex is mixed with a nonfluorinated polymer latex in the desired proportions.

In general, the compositions of this invention may be prepared by any of the known techniques for emulsion polymerization of vinyl compounds. The process will be carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include:

2,2'-azodiisobutyramidine dihydrochloride,
2,2'-azodiisobutyronitrile,
2,2'-azobis(2,4-dimethyl-4-methoxyvaleronitrile),
sodium peroxide,
barium peroxide,
hydrogen peroxide,
ammonium persulfate,
potassium persulfate, and the like. The concentration of the catalyst for the polymerization usually is between 0.1% and 2% based on the weight of the monomers. The surface active agents employed to stabilize the emulsion during its makeup and polymerization are anionic, cationic, or non-ionic emulsifying agents, but preferably they are the cationic or non-ionic type. Representative anionic emulsifying agents are alkyl ($C_{10}$ to $C_{18}$)-sodium sulfate, sodium alkyl ($C_{12}$ to $C_{18}$)-benzenesulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium ω-H-polyfluoroalkanoate ($C_8$ to $C_{10}$), and ammonium perfluoroalkanoate. The cationic agents that may be employed include dodecyltrimethylammonium acetate, trimethyltetradecylammonium chloride, hexadecyltrimethylammonium bromide, trimethyloctadecylammonium chloride, (dodecylmethylbenzyl)-trimethylammonium chloride, benzyldodecyldimethylammonium chloride, N-[2-(diethylamino)ethyl]-oleamide hydrochloride. Non-ionic surface active agents that may be employed include condensation products of ethylene oxide with hexylphenol, isooctylphenol, hexadecanol, oleic acid, alkane($C_{12}$–$C_{16}$)-thiol, alkyl($C_{12}$–$C_{18}$)amines and the like. In addition, small amounts of chain transfer agents may be present during the polymerization, such as, for example, an alkanethiol of 4 to 12 carbon atoms.

Suitable substrates for the application of the compositions of this invention are films, fibers, yarns, fabrics, and articles made from filaments, fibers, or yarns derived from natural, modified natural, or synthetic polymeric materials or from blends of these other fibrous materials and other porous materials which will absorb and transport low surface tension liquids either on their surfaces or in their interstices by capillary action. Specific representative examples are cotton, silk, regenerated cellulose, nylon, fiber-forming linear polyesters, fiber-forming polyacrylonitrile, cellulose nitrate, cellulose acetate, ethyl cellulose, paper, fiber glass, wood pressed or otherwise hardened wood composites, metals, unglazed porcelain, porous concrete and the like. Dyed and undyed cotton sateen, poplin, broadcloth, jean cloth, gabardine and the like are especially adaptable for treatment with the compositions of this invention to provide products having a high repellency to oil and water and being relatively unaffected by the action of heat, air and light. Materials rendered oil and water-repellent by the invention polymer compositions retain a portion of the original repellent when laundered and dry cleaned.

The compositions are applied preferably as an aqueous dispersion by brushing, dipping, spraying, padding, rollcoating or by any combination of these methods. For example, the prepared concentrated dispersion of polymer composition may be used as a pad bath by diluting it with water to a solids content of 0.1% to 10% by weight of the bath. The textile material, or paper if desired, is padded in this bath, and is then freed of excess liquid, usually by squeeze rolls, so that the dry pickup (weight of the dry polymer on fiber) is between about 0.1% and 10% by weight of the fiber. The treated material is then heated at 165° C. to 195° C. for at least about 15 seconds to impart maximum durability of the agent on the material. The resulting textile material or paper will be found to be resistant to water and oil, and the textile material will retain its resistance to such agents even after many launderings and dry cleanings. The polymer may, if desired, be dispersed in liquids other than water.

Other methods for applying the compositions include the use of solutions in place of dispersions and stepwise deposition of the two polymers. Application from solution is carried out in the same ways, in general, as the application of dispersions. Stepwise application involves deposition of the two polymers separately, usually the nonfluorinated polymer first. Each polymer may be applied either as a dispersion or solution by any of the means described and a curing step may be used after both steps, if desired. The cure after the second application is necessary.

The following representative examples illustrate the present invention.

EXAMPLE I

This example illustrates the preparation of alcohols of structure $C_nF_{2n+1}CH_2CH_2OH$.

A mixture of 49.6 parts of 1-iodoperfluoroheptane, 8.6 parts of uninhibited vinyl acetate and 0.1 part of α,α'- azobisisobutyronitrile was heated under nitrogen at 70–80° C. for five hours. Then 4.0 parts of 1-iodoperfluoroheptane and 0.1 part of azonitrile were added and heating was continued for two hours (the reaction is somewhat exothermic). Excess iodide was pumped off at 60°/8 mm., leaving 57.4 parts of liquid residue (95% yield of $C_7F_{15}CH_2CHIO_2CCH_3$).

*Analysis.*—Calculated for $C_{11}H_6F_{15}O_2I$: C, 22.7; H, 1.0; F, 48.9; I, 21.8. Found: C, 24.2; H, 1.5; F, 49.1; I, 20.9.

The crude iodoacetate obtained (55 parts) was dissolved in 80 parts of 95% ethanol and this solution was added over a period of one hour to a slurry of 20 parts of zinc dust in 120 parts of 95% ethanol and 10 parts of concentrated hydrochloric acid. Two 5-part portions of hydrochloric acid were added during the addition. The mixture was then stirred for one hour, cooled to 25° C. and diluted with 100 parts of water. The oil layer was collected and the aqueous layer extracted with chloroform. Distillation of the combined chloroform solution gave 39.7 parts (95%) of crude product which was then heated at 60° C. for one hour with 50 parts of 10% ethanolic potassium hydroxide. The mixture was drowned in water and extracted with chloroform which after drying over magnesium sulfate, was distilled giving $C_7F_{15}CH_2CH_2OH$, B.P. 84° C./10 mm., $n_D^{25}$ 1.3164.

*Analysis.*—Calculated for $C_9F_{15}H_5O$: C, 26.2; H, 1.2. Found: C, 26.4; H, 1.6.

Using essentially the same procedure the following were prepared: $C_{11}F_{23}CH_2CH_2OH$, $C_3F_7CH_2CH_2OH$, $C_4F_9CH_2CH_2OH$, $C_6F_{13}CH_2CH_2OH$, $C_8F_{17}CH_2CH_2OH$, $C_9F_{19}CH_2CH_2OH$, $C_{10}F_{21}CH_2CH_2OH$, $C_{12}F_{25}CH_2CH_2OH$.

EXAMPLE II

This example illustrates the general method of preparation of $CH_2=C(CH_3)CO_2CH_2CH_2C_nF_{2n+1}$.

31.0 parts of methyl methacrylate, 21.4 parts of 1H,1H,2H,2H-heptafluoropentanol-1, 0.6 part of phenothiazine and 1.1 parts of concentrated sulfuric acid were charged into a reactor fitted with a nitrogen inlet, a stirrer, a thermometer and a helices-packed distillation column topped by a fractionation head which carefully controlled the reflux ratio. The mixture was agitated under nitrogen and heated to 100° C. The reflux ratio was adjusted so that the head temperature did not exceed 90° C. The composition of the distillate (methanol and methyl methacrylate) and reaction mixture was followed by gas chromatography. Conversion was 90% in 6–7 hours. The reaction mixture was then cooled and washed with 100 part portions of water until acid free. Fractionation of the mixture gave 24 parts (85% yield) of 1H,1H,2H,2H-heptafluoropentyl methacrylate,

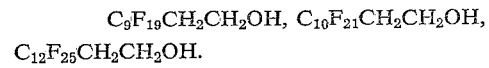

B.P. 66–68° C./20 mm., $n_D^{25}$ 1.3566.

*Analysis.*—Calculated for $C_9H_7F_9O_2$: C, 38.3; H, 3.19; F, 47.1. Found: C, 38.7; H, 3.20; F, 47.0.

Using the same procedure, the following other esters were prepared:

$CF_3(CF_2)_6CH_2CH_2O_2CC(CH_3)=CH_2$, B.P. 57–58° C./0.4 mm. $n_D^{25}$ 1.3438.

$CF_3(CF_2)_7CH_2CH_2O_2CC(CH_3)=CH_2$, B.P. 60–70° C./0.1 mm., $n_D^{25}$ 1.3412.

$CF_3(CF_2)_3CH_2CH_2O_2CC(CH_3)=CH_2$, B.P. 60–62° C./5 mm., $n_D^{25}$ 1.3530.

$CF_3(CF_2)_5CH_2CH_2O_2CC(CH_3)=CH_2$, B.P. 60–63° C./1.0 mm., $n_D^{25}$ 1.3465.

$CF_3(CF_2)_9CH_2CH_2O_2CC(CH_3)=CH_2$, B.P. 95–100° C./0.1 mm., M.P. 46–50° C. (wax-like).

$CF_3(CF_2)_6CH_2CH_2O_2CCH=CH_2$, B.P. 60–61° C./.10 mm., $n_D^{25}$ 1.3370.

EXAMPLE III

The polymerization was run at 65° C. for six hours with the following recipe added in order shown:

| | Parts |
|---|---|
| Water | 30.0 |
| Trimethyloctadecylammonium bromide | 1.0 |
| 1H,1H,2H,2H-heptadecafluorodecyl methacrylate | 10.0 |
| Acetone | 5.0 |
| Azodiisobutyramidine dihydrochloride | 0.2 |

The solids content of the resulting latex was about 20%.

The other polymers described hereinafter, both fluorinated and nonfluorinated, were prepared using the same procedure.

EXAMPLE IV

This example illustrates the general technique for evaluating for oil and water repellency. This procedure was used in all the following examples unless otherwise noted.

A sample of the latex of poly(1H,1H,2H,2H-heptadecafluorodecyl methacrylate) obtained in Example III was divided into two portions. One portion was diluted with water to 0.6% solids, the other portion to 0.2% solids. These two latexes were padded onto samples of fabrics (8 inches by 8 inches) by dipping and passing through a squeeze roll adjusted so that the squeezed fabric contained its own weight of latex (100% wet pick-up). The fabric samples were then air dried for at least 45 minutes and then oven cured for two to three minutes at 175° C.

The treated fabric samples were tested for water repellency using A.A.T.C.C. Standard Test Method 22–1952 of the American Association of Textile Chemists and Colourists. A rating of 100 denotes no water penetration or surface adhesion, a rating of 90 denotes slight random sticking or wetting and so on.

The oil repellency test comprises placing a drop of test solution carefully on the textile on a flat horizontal surface. After two minutes, any penetration or wicking into the fabric is noted visually. To aid in the observation, the test solutions contained a small amount of oil-soluble blue dye to increase visibility. The nature of the test solutions is shown below; Nujol of course is a purified petroleum oil. Anything with a rating of five or greater is good or excellent, anything with a rating of one or over can be used for certain purposes. As an example, if a treated fabric repels the No. 1–6 solutions but not the number 7 solution, its rating is 6.

| Oil Repellency Rating | Test Solution | Surface Tension, dynes/cm. at 25° C. |
|---|---|---|
| 9 | n-Hexane | 19.2 |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 50-50 hexadecane-Nujol | 28.7 |
| 1 | Nujol | 31.2 |

The results are:

| Percent Fluorinated Polymer OWF | Poly ($C_8F_{17}CH_2CH_2O_2CC(CH_3)=CH_2$) | |
|---|---|---|
| | Oil | Water |
| 0.6 | 6 | 70 |
| 0.2 | 6 | 70 |

EXAMPLE V

This example illustrates the general technique for applying mixtures of fluorinated polymers and non-fluorinated polymers (not copolymers) and the general curing technique for treating fabrics. This procedure was used in all of the following examples unless noted otherwise.

Mixtures of polymer latexes were prepared with the solids contents comprising 20%, 15%, 10%, 7% and 5% by weight poly(1H,1H,2H,2H-perfluoroalkyl methacrylates) and the remainder poly(n-octyl methacrylate). Portions of each mixture were then diluted with water to 3% total solids and other portions to 1% total solids. Samples of cotton fabric were then treated with each of these latexes to obtain 100% wet pick-up, air dried for at least 45 minutes and then oven cured for two to three minutes at 175° C. with the results shown in the table which follows. Other polymer and copolymer mixtures were prepared, applied and tested as previously described. The results are also shown in the following table.

In the table which follows, columns "I" and "II," with numerical and capital letter designation, represent fluorinated and non-fluorinated compositions, respectively, as follows:

In columns "I" and "II," as heretofore described, the designations "(c)" and "d)" reflect copolymer and mixture of homopolymers, respectively.

Columns "III" and "IV" of this table represent the loading percent on weight of fabric (percent OWF) and the percent of fluorinated monomer on the weight of the polymer solid (head of columns-percent OWPA) with oil and water repellency figures, respectively.

TABLE

| I | II | III | IV |||||||||
|---|---|---|---|---|---|---|---|---|---|---|---|
| | | | 20 || 15 || 10 || 7 || 5 ||
| | | | Oil | H₂O | Oil | H₂O | Oil | H₂O | Oil | H₂O | Oil | H₂O |
| 1 | A | 3 | 2 | 50 | 2 | 50 | 2 | 50 | 1 | 50 | 1 | 50 |
|   |   | 1 | 1 | 50 | 1 | 50 | 1 | 0 | 1 | 0 | 0 | 0 |
| 2 | B | 3 | 7 | 100 | 7 | 80 | 7 | 80 | 7 | 70 | 2 | 50 |
|   |   | 1 | 5 | 90 | 5 | 70 | 4 | 70 | 1 | 50 | 1 | 50 |
| 3 | C | 3 | 6 | 70 | 6 | 70 | 6 | 70 | 6 | 70 | 2 | 50 |
|   |   | 1 | 6 | 70 | 6 | 70 | 2 | 70 | 1 | 50 | 1 | 50 |
| 4 | D | 3 | 7 | 100 | 7 | 100 | 7 | 100 | 7 | 90 | 7 | 80 |
|   |   | 1 | 3 | 100 | 3 | 90 | 2 | 99 | 1 | 70 | 1 | 50 |
| 5 | E | 3 | 7 | 100 | 7 | 100 | 7 | 100 | 7 | 100 | 7 | 70 |
|   |   | 1 | 3 | 90 | 3 | 80 | 2 | 70 | 1 | 50 | 1 | 50 |
| 6 | F | 3 | 7 | 100 | 7 | 100 | 7 | 100 | 6 | 70 | 5 | 70 |
|   |   | 1 | 5 | 100 | 4 | 100 | 3 | 70 | 1 | 50 | 1 | 50 |
| 7 | G | 3 | 7 | 90 | 7 | 90 | 7 | 90 | 7 | 80 | 7 | 70 |
|   |   | 1 | 7 | 90 | 6 | 90 | 6 | 90 | 5 | 70 | 3 | 50 |
| 8 | H | 3 | 7 | 90 | 7 | 90 | 7 | 90 | 7 | 70 | 7 | 70 |
|   |   | 1 | 5 | 90 | 5 | 90 | 5 | 80 | 5 | 70 | 2 | 50 |
| 9 | I | 3 | 7 | 100 | 7 | 90 | 7 | 90 | 7 | 80 | 6 | 70 |
|   |   | 1 | 2 | 50 | 1 | 50 | 1 | 50 | 1 | 50 | 1 | 50 |
| 10 | J | 3 | 6 | 70 | 6 | 70 | 6 | 50 | 4 | 50 | 2 | 50 |
|   |   | 1 | 3 | 70 | 2 | 50 | 1 | 50 | 1 | 50 | 1 | 0 |
| 11 | K | 3 | 7 | 90 | 7 | 80 | 7 | 80 | 6 | 70 | 4 | 50 |
|   |   | 1 | 4 | 70 | 2 | 70 | 2 | 70 | 1 | 50 | 1 | 50 |
| 12 | L | 3 | 8 | 100 | 8 | 100 | 8 | 90 | 6 | 70 | 4 | 50 |
|   |   | 1 | 5 | 90 | 4 | 90 | 2 | 70 | 1 | 50 | 1 | 50 |
| 13 | M | 3 | 8 | 100 | 8 | 90 | 8 | 70 | 6 | 70 | 3 | 50 |
|   |   | 1 | 5 | 90 | 5 | 70 | 3 | 70 | 1 | 50 | 1 | 50 |
| 14 | N | 3 | 8 | 100 | 8 | 100 | 8 | 90 | 7 | 70 | 5 | 50 |
|   |   | 1 | 6 | 100 | 6 | 100 | 3 | 70 | 2 | 50 | 1 | 50 |
| 15 | O | 1 | -- | -- | 6 | 100 | -- | -- | -- | -- | -- | -- |

EXAMPLE VI

Four samples of cotton fabric were treated with a 3% latex of poly(n-octyl methacrylate) (100% wet pick-up), cured and dried as previously described. Two samples were then treated with 0.6% and 0.2% solutions of poly

| I | II |
|---|---|
| 1<br>$C_3F_7CH_2CH_2O_2CC(CH_3)=CH_2$ | A<br>$C_8H_{17}O_2CC(CH_3)=CH_2$ |
| 2<br>$C_7F_{15}CH_2CH_2O_2CC(CH_3)=CH_2$ | B<br>$C_8H_{17}O_2CC(CH_3)=CH_2$ |
| 3<br>$C_4F_9CH_2CH_2O_2CC(CH_3)=CH_2$ | C<br>$C_8H_{17}O_2CC(CH_3)=CH_2$ |
| 4<br>$C_6F_{13}CH_2CH_2O_2CC(CH_3)=CH_2$ | D<br>$C_8H_{17}O_2CC(CH_3)=CH_2$ |
| 5<br>$C_8F_{17}CH_2CH_2O_2CC(CH_3)=CH_2$ | E<br>$C_8H_{17}O_2CC(CH_3)=CH_2$ |
| 6(c)<br>$C_4F_9CH_2CH_2O_2CC(CH_3)=CH_2$ 50%<br>$C_8F_{17}CH_2CH_2O_2CC(CH_3)=CH_2$ 50% | F<br>$C_8H_{17}O_2CC(CH_3)=CH_2$ |
| 7<br>$C_7F_{15}CH_2CH_2O_2CC(CH_3)=CH_2$ | G(c)<br>$C_8H_{17}O_2CC(CH_3)=CH_2$ 99%<br>$CH_2=CHCONHCH_2OH$ 1% |
| 8<br>$C_7F_{15}CH_2CH_2O_2CC(CH_3)=CH_2$ | H(c)<br>$C_8H_{17}O_2CC(CH_3)=CH_2$ 98%<br>$CH_2=CHCONHCH_2OH$ 2% |
| 9(c)<br>$C_5F_9CH_2CH_2O_2\ C(CH_3)=CH_2$ 33%<br>$C_6F_{13}CH_2CH_2O_2CC(CH_3)=CH_2$ 33%<br>$C_8F_{17}CH_2CH_2O_2CC(CH_3)=CH_2$ 33% | I<br>$C_8H_{17}O_2CC(CH_3)=CH_2$ |
| 10(c)<br>$C_4F_9CH_2CH_2O_2CC(CH_3)=CH_2$ 50%<br>$C_6F_{13}CH_2CH_2O_2CC(CH_3)=CH_2$ 25%<br>$C_8F_{17}CH_2CH_2O_2CC(CH_3)=CH_2$ 25% | J(c)<br>$C_8H_{17}O_2CC(CH_3)=CH_2$ 98%<br>$CH_2=CHCONHCH_2OH$ 2% |
| 11(c)<br>$C_4F_9CH_2CH_2O_2CC(CH_3)=CH_2$ 25%<br>$C_6F_{13}CH_2CH_2O_2CC(CH_3)=CH_2$ 50%<br>$C_8F_{17}CH_2CH_2O_2CC(CH_3)=CH_2$ 25% | K(c)<br>$C_8H_{17}O_2CC(CH_3)=CH_2$ 98%<br>$CH_2=CHCONHCH_2OH$ 2% |
| 12(d)<br>$C_4F_9CH_2CH_2O_2CC(CH_3)=CH_2$ 33%<br>$C_6F_{13}CH_2CH_2O_2CC(CH_3)=CH_2$ 33%<br>$C_8F_{17}CH_2CH_2O_2CC(CH_3)=CH_2$ 33% | L(c)<br>$C_8H_{17}O_2CC(CH_3)=CH_2$ 98%<br>$CH_2=CHCONHCH_2OH$ 2% |
| 13(d)<br>$C_4F_9CH_2CH_2O_2CC(CH_3)=CH_2$ 50%<br>$C_6F_{13}CH_2CH_2O_2CC(CH_3)=CH_2$ 25%<br>$C_8F_{17}CH_2CH_2O_2CC(CH_3)=CH_2$ 25% | M(c)<br>$C_8H_{17}O_2CC(CH_3)=CH_2$ 98%<br>$CH_2=CHCONHCH_2OH$ 2% |
| 14(d)<br>$C_4F_9CH_2CH_2O_2CC(CH_3)=CH_2$ 25%<br>$C_6F_{13}CH_2CH_2O_2CC(CH_3)=CH_2$ 25%<br>$C_8F_{17}CH_2CH_2O_2CC(CH_3)=CH_2$ 50% | N(c)<br>$C_8H_{17}O_2CC(CH_3)=CH_2$ 98%<br>$CH_2=CHCONHCH_2OH$ 2% |
| 15(c)<br>$C_6F_{13}CH_2CH_2O_2CC(CH_3)=CH_2$ 50%<br>$C_8F_{17}CH_2CH_2O_2CC(CH_3)=CH_2$ 33%<br>$C_{10}F_{21}CH_2CH_2O_2CC(CH_3)=CH_2$ 17% | O(c)<br>$n\text{-}C_4H_9O_2CC(CH_3)=CH_2$ 48%<br>$n\text{-}C_4H_9CH(C_2H_5)CH_2O_2CC(CH_3)=CH_2$ 48%<br>$CH_2=CHNHCH_2OH$ 4% |

(1H,1H,2H,2H - pentadecafluorononyl methacrylate) in 50–50 trifluoromethylbenzene-1,3 - bistrifluoromethylenebenzene (100% wet pick-up). These samples were then dried and cured as previously described. The results are shown below.

| Percent Fluorinated Polymer OWF | Poly ($C_7F_{15}CH_2CH_2O_2CC(CH_3)=CH_2$) | |
|---|---|---|
| | Oil | Water |
| 0.6 | 6 | 70 |
| 0.2 | 4 | 70 |

In the same manner as above, the other two samples of cloth were treated with 0.6% and 0.2% solutions of poly(1H,1H,2H,2H-pentadecafluorononyl acrylate) in the same solvent mixture. After drying and curing as heretofore described, the following results were obtained.

| Percent Fluorinated Polymer OWF | Poly ($C_7F_{15}CH_2CH_2O_2CCH=CH_2$) | |
|---|---|---|
| | Oil | Water |
| 0.6 | 3 | 50 |
| 0.2 | 3 | 50 |

In the same manner as the above examples the polymers and copolymer mixtures described above are applied to other textiles such as wool, polyethylene terephthalate polyacrylonitrile, nylon and the like with comparable results. The same method of application, in principle, is used for application to leather and the like. For application to paper, the same methods may also be used, or more conveniently, the compositions may be added to the beater stock wherein it becomes incorporated into the paper; the usual drying step of paper manufacture being sufficient to cure the polymer composition to the paper. The same methods of application of the polymer and copolymer mixtures can be used for wood, wood products, metals and other porous materials. The curing step of heating to 165–195° C. is needed in all cases. In the case of treated metals, cetane contact angles of 80° or higher are obtained.

The preceding examples illustrate the preparation of the compositions of this invention and their use for rendering textile fabrics and other substrates oil and water repellent when no other adjuvants or textile treating agents are used. As noted hereinbefore, it is common practice in the textile industry to treat fabrics with several agents at the same time. These agents may include softeners, crease resistance agents, wetting agents, antistatic agents, resin finishes and the like. Many of these agents tend to dilute the vinyl polymer portion of the present polymer composition with material which are inert as oil and water repellents. In such cases better results are obtained if higher concentrations of fluorinated polymers prepared from $$CH_2=C(CH_3)-CO_2CH_2CH_2C_nF_{2n+1}$$

are used than when the oil and water repellent compositions of this invention are used alone. As indicated earlier, when other adjuvants are not used about 25% by weight fluorinated polymer in the polymer composition is the practical upper limit. Greater concentrations serve no useful purpose and increase cost. When other adjuvants are present up to about 60% by weight fluorinated polymer gives useful results, but about 60% is the practical upper limit. About 40% by weight fluorinated polymer is preferred in such cases, particularly from a value in use viewpoint. It should be understood that oil and water repellency may still be obtained, although not improved, if more than about 60% fluorinated polymer is used. Indeed, high oil and water repellency can be obtained using as high as 95% fluorinated polymer. Examples VII and VIII which follow illustrate the use of higher concentrations of fluorinated polymer associated with textile treating baths containing other adjuvants than the oil and water repellent compositions of this invention.

EXAMPLE VII

Following the procedure of Example II, polymers were prepared according to each of the following recipes.

A. Fluorinated polymer

| | Parts |
|---|---|
| Water | 2,200 |
| Fluorinated monomer [1] | 1,000 |
| n-Butyl acrylate | 20 |
| N-methylolacrylamide as 60% aqueous solution | 5 |
| Dimethyloctadecylamine | 30 |
| Glacial acetic acid | 18.3 |
| Acetone | 791 |
| Azodiisobutyramidine dihydrochloride | 0.4 |

[1] The monomer was $CH_2=C(CH_3)CO_2CH_2CH_2(CF_2)_nF$ with $n=6$, 8 and 10 in the relative proportions 3:2:1, respectively, and also small amounts of $n=12$ and 14.

The mixture was heated at 60° C. for four hours. The resulting emulsion was used in Example VIII below.

B. Non-fluorinated monomer

| | Parts |
|---|---|
| Water | 2,200 |
| 2-ethylhexyl methacrylate | 1,000 |
| N-methylolacrylamide as 60% aqueous solution | 18 |
| Dimethyloctadecylamine | 20 |
| Glacial acetic acid | 12.2 |
| Sodium chloride | 0.7 |
| Acetone | 237 |
| Azodiisobutyramidine dihydrochloride | 0.222 |

The mixture was heated at 70° C. for four hours. The resulting emulsion was used in Example VIII below.

EXAMPLE VIII

Mixtures of fluorinated and non-fluorinated polymer emulsions prepared in Example VII were prepared containing 15%, 20%, 30%, 40%, 50% and 60% fluorinated polymer on the weight of the polymer solids. A series of six pad baths were prepared from each of these polymer mixtures according to the recipe below, combining each of the three Phobotex concentrations shown with each of the two polymer concentrations shown.

| | Percent |
|---|---|
| Water | To make 100 |
| Nonylphenoxypoly(ethyleneoxy)ethanol (Igepal 630–Antara) | 0.04 |
| Tartaric acid | 0.04 |
| Aqueous dispersion of polyethylene (Protolub PE-Proctor Chemical Co.) | 1.50 |
| Resin finish for cotton (Aerotex 23—American Cyanamid) | 5.00 |
| Magnesium chloride | 0.50 |
| Phobotex [1] | 1.083, 2.500, 3.333 |
| Polymer mixture | 3.333, 4.167 |

[1] Phobotex is a mixture of 25% wax and 75% the acetate derivative prepared from hexamethylolmelamine, stearic acid and triethanolamine as described in U.S. Patent No. 2,783,231—Ciba.

Samples of cotton poplin and 50:50 cotton-"Dacron" blend ("Dacron" is Du Pont's trade name for polyethylene terephthalate fiber) were padded with each of the pad baths to obtain 60% wet pick-up, following the general procedure of Example V. After curing as described in Example V, each treated fabric sample was evaluated for oil and water repellency. Portions of each fabric sample were then given three standard washings and other portions three standard dry cleanings. These portions were then evaluated for oil and water repellency. All repellencies were obtained as in Example IV. The results are shown in the table below. In the table, Column I gives the amount of fluorinated polymer in the polymer mixture with nonfluorinated polymer on the weight of polymer solids (OWPS). In the column headed Loading, OWF means on the weight of fabric and Polymer refers to the mixture of fluorinated and nonfluorinated polymers.

A standard washing consists of immersing the fabric sample for 15 minutes with agitation in water at 70–80° C. containing 0.2% by weight heavy duty, built detergent (Tide), rinsing in boiling water, then cold water and ironing at 235° F. A standard dry cleaning consists of agitating the fabric sample for 20 minutes with tetrachloroethylene containing 2.5% by weight commercial dry cleaning detergent (R. R. Street Co.) and 0.5% water at 80° F. and then drying and ironing 235° F.

The results in the table show that in the formulations used, mixtures of nonfluorinated and fluorinated polymers containing up to 60% fluorinated polymer are useful oil and water repellents.

TABLE I — Repellencies Cotton Poplin

| OWPS | Loading, percent OWF | | Initial | | 3 SW[1] | | 3 SD[2] | |
|---|---|---|---|---|---|---|---|---|
| | Polymer | Phobotex | Oil | Water | Oil | Water | Oil | Water |
| 15 | 2.0 | 0.65 | 8 | 100 | 7 | 80 | 7 | 80− |
| | 2.0 | 1.50 | 5 | 100 | 7 | 90− | 7 | 70+ |
| | 2.0 | 2.00 | 4 | 100 | 5 | 100− | 4 | 70+ |
| | 2.5 | 0.65 | 8 | 100 | 7 | 90− | 8 | 80− |
| | 2.5 | 1.50 | 7 | 100 | 7 | 90− | 7 | 70+ |
| | 2.5 | 2.00 | 7 | 100 | 7 | 90− | 7 | 70+ |
| 20 | 2.0 | 0.65 | 8 | 100 | 7 | 70+ | 7 | 70 |
| | 2.0 | 1.50 | 7 | 100 | 7 | 80 | 7 | 70+ |
| | 2.0 | 2.00 | 7 | 100 | 7 | 90+ | 7 | 70+ |
| | 2.5 | 0.65 | 8 | 100 | 7 | 90 | 8 | 80− |
| | 2.5 | 1.50 | 8 | 100 | 7 | 80 | 8 | 70+ |
| | 2.5 | 2.00 | 8 | 100 | 7 | 100 | 8 | 70+ |
| 30 | 2.0 | 0.65 | 8 | 100 | 7 | 80− | 7 | 80− |
| | 2.0 | 1.50 | 8 | 100 | 7 | 80+ | 7 | 80− |
| | 2.0 | 2.00 | 8 | 100 | 7 | 90 | 7 | 80− |
| | 2.5 | 0.65 | 8 | 100 | 7 | 80− | 8 | 80− |
| | 2.5 | 1.50 | 8 | 100 | 7 | 90− | 7 | 80 |
| | 2.5 | 2.00 | 8 | 100 | 7 | 100 | 7 | 80− |
| 40 | 2.0 | 0.65 | 8 | 100 | 7 | 80− | 7 | 80− |
| | 2.0 | 1.50 | 8 | 100 | 7 | 80+ | 7 | 80− |
| | 2.0 | 2.00 | 8 | 100 | 7 | 80+ | 7 | 80 |
| | 2.5 | 0.65 | 8 | 100 | 7 | 80+ | 8 | 80 |
| | 2.5 | 1.50 | 8 | 100 | 7 | 80 | 7 | 80− |
| | 2.5 | 2.00 | 8 | 100 | 7 | 90− | 7 | 80 |
| 50 | 2.0 | 0.65 | 8 | 100 | 7 | 80− | 7 | 80− |
| | 2.0 | 1.50 | 7 | 100 | 7 | 90− | 7 | 80 |
| | 2.0 | 2.00 | 8 | 100 | 7 | 80+ | 7 | 80− |
| | 2.5 | 0.65 | 8 | 100 | 7 | 70+ | 7 | 80 |
| | 2.5 | 1.50 | 8 | 100 | 7 | 80+ | 7 | 70+ |
| | 2.5 | 2.00 | 8 | 100 | 7 | 90− | 7 | 70+ |
| 60 | 2.0 | 0.65 | 8 | 100 | 7 | 70+ | 7 | 70+ |
| | 2.0 | 1.50 | 7 | 100 | 7 | 80− | 2 | 70 |
| | 2.0 | 2.00 | 7 | 100 | 7 | 90 | 2 | 70 |
| | 2.5 | 0.65 | 8 | 100 | 7 | 80− | 7 | 70+ |
| | 2.5 | 1.50 | 8 | 100 | 7 | 80 | 7 | 70+ |
| | 2.5 | 2.00 | 8 | 100 | 7 | 100− | 7 | 70+ |

[1] After 3 standard washings.  [2] After 3 standard dry cleanings.

TABLE I — Repellencies Cotton-"Dacron" Blend 50:50

| OWPS | Loading, percent OWF | | Initial | | 3 SW[1] | | 3 SD[2] | |
|---|---|---|---|---|---|---|---|---|
| | Polymer | Phobotex | Oil | Water | Oil | Water | Oil | Water |
| 15 | 2.0 | 0.65 | 7 | 100 | 7 | 100 | 7 | 80− |
| | 2.0 | 1.50 | 6 | 100 | 7 | 100 | 4 | 70+/0 |
| | 2.0 | 2.00 | 3 | 100 | 7 | 100 | 4 | 70/0 |
| | 2.5 | 0.65 | 8 | 100 | 7 | 100 | 8 | 70/0 |
| | 2.5 | 1.50 | 7 | 100 | 7 | 100 | 7 | 70 |
| | 2.5 | 2.00 | 7 | 100 | 7 | 100 | 7 | 70+ |
| 20 | 2.0 | 0.65 | 7 | 100 | 7 | 80 | 7 | 70 |
| | 2.0 | 1.50 | 7 | 100 | 7 | 100 | 7 | 70/0 |
| | 2.0 | 2.00 | 7 | 100 | 7 | 100 | 7 | 70 |
| | 2.5 | 0.65 | 8 | 100 | 7 | 100 | 7 | 80− |
| | 2.5 | 1.50 | 7 | 100 | 7 | 100 | 7 | 70−/0 |
| | 2.5 | 2.00 | 7 | 100 | 7 | 100 | 7 | 70+ |
| 30 | 2.0 | 0.65 | 8 | 100 | 7 | 90− | 7 | 80− |
| | 2.0 | 1.50 | 8 | 100 | 7 | 90− | 7 | 70/0 |
| | 2.0 | 2.00 | 8 | 100 | 7 | 100 | 7 | 70 |
| | 2.5 | 0.65 | 8 | 100 | 7 | 100 | 7 | 80− |
| 40 | 2.0 | 0.65 | 7 | 100 | 7 | 90 | 7 | 70/0 |
| | 2.0 | 1.50 | 7 | 100 | 7 | 90 | 7 | 70/0 |
| | 2.0 | 2.00 | 7 | 100 | 7 | 100 | 6 | 70/0 |
| | 2.5 | 0.65 | 8 | 100 | 7 | 80+ | 7 | 70+ |
| | 2.5 | 1.50 | 7 | 100 | 7 | 100− | 7 | 70+ |
| | 2.5 | 2.00 | 7 | 100 | 7 | 100 | 7 | 70/0 |
| 50 | 2.0 | 0.65 | 8 | 100 | 7 | 80 | 7 | 70−/0 |
| | 2.0 | 1.50 | 8 | 100 | 7 | 100− | 6 | 70 |
| | 2.0 | 2.00 | 8 | 100 | 7 | 100− | 6 | 70/0 |
| | 2.5 | 0.65 | 8 | 100 | 7 | 90− | 7 | 70+ |
| | 2.5 | 1.50 | 8 | 100 | 7 | 90 | 7 | 70 |
| | 2.5 | 2.00 | 8 | 100 | 7 | 100 | 7 | 70/0 |
| 60 | 2.0 | 0.65 | 8 | 100 | 8 | 80 | 7 | 70+ |
| | 2.0 | 1.50 | 7 | 100 | 7 | 90+ | 4 | 70/0 |
| | 2.0 | 2.00 | 7 | 100 | 7 | 100 | 4 | 70/0 |
| | 2.5 | 0.65 | 8 | 100 | 8 | 100− | 7 | 70/0 |
| | 2.5 | 1.50 | 7 | 100 | 8 | 100− | 7 | 70+ |
| | 2.5 | 2.00 | 7 | 100 | 7 | 100 | 7 | 70 |

[1] After 3 standard washings.  [2] After 3 standard dry cleanings.

It is understood that the preceding examples may be varied, within the scope of the total specification as understood by those skilled in the art, to achieve substantially the same results.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polymeric composition consisting essentially of
    (1) from about 3% to about 60% by weight of a polymer consisting of units derived from at least one polymerizable compound of the structure $$C_nF_{2n+1}CH_2CH_2O_2CC(CH_3)=CH_2$$

wherein $n$ has a value of from 3 to 14; and the balance being essentially
    (2) from about 97% to about 40% by weight of a polymer consisting of units derived from at least one polymerizable compound selected from the group consisting of
        (a) monovinyl compounds free of nonvinylic fluorine, and
        (b) nonfluorinated conjugated dienes.

2. The polymeric composition of claim 1 wherein the polymer defined in part (2) is selected from the group consisting of

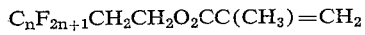

$CH_2=CHO_2CR^2$, $CH_2=CHR^3$, $CH_2=CHY$, $CH_2=CY_2$, $CH_2=CHCH_2O_2CR^2$,

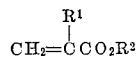

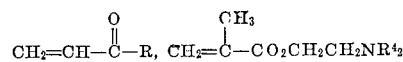

$CH_2=CR^1CONHCH_2OH$, 1,3-butadien, 2-chlorobutadiene, 2,3-dichloro-1,3-butadiene and isoprene; wherein $R^1$ is H or methyl, $R^2$ is a saturated alkyl group containing from one to 18 carbons, $R^3$ is phenyl or alkyl-substituted phenyl, $R^4$ is hydrogen or saturated alkyl groups of one to six carbons and Y is fluorine, chlorine or bromine.

3. A polymeric composition consisting essentially of
    (1) a copolymer consisting of
        (a) from about 25% to about 99% by weight of units derived from at least one polymerizable fluorine-containing compound of the structure $CH_2=C(CH_3)CO_2CH_2CH_2C_nF_{2n+1}$ wherein $n$ is from 3 to 14 and the balance of the copolymer being essentially
        (b) from about 75% to about 1% by weight of units derived from at least one polymerizable vinyl compound free of non-vinylic fluorine, and
    (2) a vinyl polymer consisting of units derived from at least one polymerizable compound selected from the group consisting of
        (a) mono-vinyl compounds free of non-vinylic fluorine, and
        (b) nonfluorinated conjugated dienes, the weight proportion of said copolymer and said vinyl polymer being such that the mixture contains from 3% to 60% by weight of units derived from said polymerizable fluorine-containing compound component.

4. The polymeric composition of claim 3 wherein the polymerizable vinyl compound free of non-vinylic fluorine of part (1)(b) is selected from the class consisting of alkyl acrylates, alkyl methacrylates, vinyl esters of aliphatic acids, styrene, alkyl styrenes, vinyl halides, vinylidene halides, alkyl esters, vinyl alkyl ketones, acrylamides, and 1,3-butadiene;
    and wherein the vinyl polymer of part (2) is selected from the class consisting of

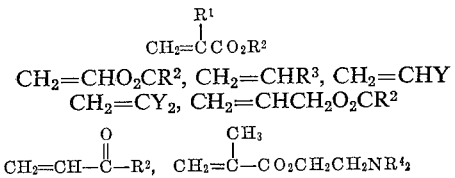

$CH_2=CR^1CONHCH_2OH$, 1,3-butadiene, 2-chlorobutadiene, 2,3-dichloro-1,3-butadiene and isoprene; wherein $R^1$ is H or methyl, $R^2$ is a saturated alkyl group containing from one to 18 carbons, $R^3$ is phenyl or alkyl-substituted phenyl, $R^4$ is hydrogen or saturated alkyl groups of one to six carbons and Y is fluorine, chlorine or bromine.

5. The polymeric composition of claim 3 wherein the units derived from the polymerizable vinyl compound free of non-vinylic fluorine of part (1)(b) are units of an alkyl acrylate and N-methylolacrylamide; and
    wherein the vinyl polymer of part (2) consists of units derived from an alkyl methacrylate and N-methylolacrylamide.

6. The polymeric composition of claim 5 wherein the alkyl acrylate of part (1)(b) is butyl acrylate; and
    wherein the alkyl methacrylate of part (2) is 2-ethylhexyl methacrylate.

References Cited
UNITED STATES PATENTS

| | | | |
|---|---|---|---|
| 2,642,416 | 6/1953 | Ahlbrecht et al. | 260—900 |
| 3,102,103 | 8/1963 | Ahlbrecht et al. | 260—29.6 |
| 3,277,039 | 10/1966 | Marascia et al. | 260—890 |
| 3,282,905 | 11/1966 | Fasick et al. | 260—890 |

MURRAY TILLMAN, *Primary Examiner.*

J. L. WHITE, G. F. LEMES, *Asssitant Examiners.*